(12) United States Patent
Höfler et al.

(10) Patent No.: US 10,208,855 B2
(45) Date of Patent: Feb. 19, 2019

(54) METHOD FOR STARTING A MOBILE VEHICLE

(71) Applicant: ZF Friedrichshafen AG, Friedrichshafen (DE)

(72) Inventors: Hans Höfler, Immenstaad am Bodensee (DE); Joachim Sauter, Ravensburg (DE); Norbert Brugger, Eriskirch (DE); Matthias Duller, Berlin (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 313 days.

(21) Appl. No.: 15/206,452

(22) Filed: Jul. 11, 2016

(65) Prior Publication Data
US 2017/0016531 A1    Jan. 19, 2017

(30) Foreign Application Priority Data
Jul. 14, 2015  (DE) ........................ 10 2015 213 152

(51) Int. Cl.
| | |
|---|---|
| *F16H 61/20* | (2006.01) |
| *F02D 41/02* | (2006.01) |
| *B60W 10/06* | (2006.01) |
| *F02D 31/00* | (2006.01) |
| *F16H 59/66* | (2006.01) |
| *F16H 63/50* | (2006.01) |

(52) U.S. Cl.
CPC ............. *F16H 61/20* (2013.01); *B60W 10/06* (2013.01); *F02D 31/001* (2013.01); *F02D 41/021* (2013.01); *F02D 41/0225* (2013.01); *F16H 59/66* (2013.01); *F02D 2200/702* (2013.01); *F16H 63/50* (2013.01); *F16H 2059/663* (2013.01); *F16H 2061/205* (2013.01); *F16H 2312/04* (2013.01)

(58) Field of Classification Search
CPC . F16H 61/20; F16H 2061/205; F16H 2312/04
See application file for complete search history.

(56) References Cited

U.S. PATENT DOCUMENTS

| | | | | |
|---|---|---|---|---|
| 4,694,709 A | * | 9/1987 | Kikuchi | F16H 61/20 477/94 |
| 5,460,580 A | * | 10/1995 | Streib | B60W 30/18027 477/110 |
| 5,662,548 A | * | 9/1997 | Mori | F16H 61/0213 477/114 |
| 7,136,735 B2 | * | 11/2006 | Carlson | F16H 61/0059 701/51 |
| 8,398,526 B2 | | 3/2013 | Hrovat et al. | |
| 8,977,449 B2 | * | 3/2015 | Gibson | B60W 20/00 701/54 |
| 9,302,667 B2 | * | 4/2016 | Tassinger | F16H 61/20 |

FOREIGN PATENT DOCUMENTS

| | | |
|---|---|---|
| DE | 100 31 816 A1 | 4/2001 |
| DE | 10 2006 012 883 A1 | 9/2007 |
| DE | 10 2010 061 208 A1 | 7/2011 |

OTHER PUBLICATIONS

German Search Report Corresponding to 10 2015 213 152.1 dated Jun. 29, 2016.

* cited by examiner

*Primary Examiner* — Sherry L Estremsky
(74) *Attorney, Agent, or Firm* — Davis & Bujold PLLC; Michael J. Bujold

(57) ABSTRACT

A method of starting or holding a mobile vehicle and, in particular, a working machine. The method determines whether the vehicle is rolling backward on an inclined surface and, as a function of that knowledge, the rotational speed of the drive engine is increased, or a downshift by one gear is carried out in the transmission.

7 Claims, No Drawings

METHOD FOR STARTING A MOBILE VEHICLE

This application claims priority from German patent application serial no. 10 2015 213 152.1 filed Jul. 14, 2015.

FIELD OF THE INVENTION

The present invention relates to a method for starting a mobile vehicle.

BACKGROUND OF THE INVENTION

Mobile vehicles of the type concerned, for example working machines such as wheel loaders or dumpers, have a drive engine, for example an internal combustion engine, which by way of a hydrodynamic torque converter drives a shiftable transmission that is functionally connected to the wheels of the vehicle.

Frequently, working machines are started not in the first gear, but in a higher gear so that on level ground the desired driving speed will be reached more quickly. On level ground the traction force in a higher gear, for example the third gear, is sufficient to accelerate the vehicle from rest, this also being referred to as starting. Depending on the weight of the vehicle and the ground inclination, however, it is possible that when starting, the vehicle will at first roll backward.

DETAILED DESCRIPTION OF THE PREFERRED EMBODIMENTS

The purpose of the present invention is to further improve the method of starting a mobile vehicle, in particular a working machine.

The object is achieved with a method having the characterizing features of the type according to the main claim.

According to the invention, as a function of condition parameters of the vehicle, either the rotational speed of the drive engine is increased or a shiftable reduction gear is downshifted from an engaged gear ratio to a higher gear ratio.

Condition parameters of the vehicle can be, for example, the recognition that the vehicle is rolling backward or the determination of the inclination of the ground on which the vehicle is standing, and, if needed, information about the vehicle's weight as well. The inclination information can be determined for example by an inclination sensor and made available to the vehicle or transmission control system. The information that the vehicle is rolling backward can be evaluated by the vehicle or transmission control system by way of a rotational direction, for example determined by a rotational speed sensor, and information about the driving direction engaged. The rotational speed sensor, which determines the rotation direction, can be for example attached to a vehicle wheel, although it is also possible for the rotational speed sensor to be arranged in the drive-train on the turbine of the hydrodynamic torque converter or a component functionally connected thereto. If now the forward driving direction is engaged but the vehicle is rolling backward, which is determined by the rotational speed sensor as the result of a contrary rotation direction, then the vehicle or transmission control system recognizes that the vehicle is rolling backward.

For example this can be recognized during starting, but it is also possible that the vehicle is being held back after driving forward and is intended to be held at rest. If the vehicle or transmission control system recognizes that the vehicle is rolling backward, then automatically either the rotational speed of the drive engine is increased or a downshift by a gear is carried out whereby the gear ratio is increased. This downshift is carried out, independently of any speed difference in the hydrodynamic torque converter and thus independently of the load, immediately when a vehicle in which a forward driving direction has been selected but the vehicle is rolling backward. Thus, as the criterion for the downshift only the driving direction signal is used.

It is also possible when rolling backward has been recognized, not to downshift immediately but, first, to increase the engine rotational speed until any further backward rolling is prevented. In this case the engine rotational speed can already be increased during the process of closing the clutches during starting, so that by increasing the engine speed early stalling of the engine is prevented.

In another version of the invention, after a gear has been engaged, the engine rotational speed is adjusted in such manner that controlled backward rolling or slow crawling can be produced, so that the driver is aware that a gear has been engaged.

When backward rolling has been recognized, it is also possible to combine with one another the increase of the engine rotational speed with the downshift to a gear with a higher gear ratio, in order to ensure that the vehicle will not roll backward on a slope even if the accelerator pedal is not actuated.

When an inclination sensor is used, the idling speed of the drive engine can be increased as a function of the vehicle's weight and the inclination. In that case when a gear is engaged there is more traction force on the turbine of the hydrodynamic torque converter, and this prevents the vehicle from rolling backward. The increase of the engine speed can be adapted in such manner that according to the inclination and the preselected gear in the transmission and the vehicle's weight, the traction force is large enough to prevent the vehicle from rolling backward. This process can even be designed such that first an increase of the rotational speed takes place to a predefined value while the transmission is in neutral, and then, when the gear engagement begins or once the gear has been engaged, depending on the inclination, the engine speed is increased further in order to have sufficient traction force for starting. Likewise, the drive engine rotational speed can be increased in such manner that backward rolling and stalling of the drive engine are prevented, especially while a gear is being or has been engaged.

In the same way, while holding the vehicle on an incline with a gear engaged the idling speed of the drive engine can be increased enough for the vehicle to roll backward only slowly, in a controlled manner. In that way the driver can additionally actuate the accelerator pedal sufficiently for the vehicle to come completely to rest. In this case the requisite idling speed increase is controlled by the transmission control system with reference to the traction force demand matched to the corresponding inclination and determined for the vehicle weight concerned.

If the hydrodynamic torque converter additionally comprises a converter bridging clutch, then while holding on an incline the idling speed is automatically increased and in addition the opening point of the converter bridging clutch is also automatically increased, so that when starting on the incline the converter bridging clutch will still be open.

By virtue of the method according to the invention, the starting or holding of the mobile vehicle, in particular a working machine, is improved further since by knowing the inclination from an inclination sensor or knowing that the vehicle is rolling backward by way of a rotational speed sensor with driving direction recognition, the drive engine and/or the transmission can be influenced in such manner that the vehicle remains at rest on the incline or only rolls backward in a controlled manner. This is achieved, for example, in that the rotational speed of the drive engine is increased or the shiftable transmission is downshifted. Especially in the case of vehicles with low idling speeds, this method is particularly important.

The invention claimed is:

1. A method of starting or holding a mobile vehicle, having a drive engine which drives a vehicle wheel by way of a hydrodynamic torque converter, the method comprising: either:
   increasing a rotational speed of the drive engine, or
   downshifting a shiftable step-down transmission from an engaged gear ratio to a higher gear ratio,
   for starting or holding the vehicle as a function of at least one condition parameter of the vehicle; and
   determining an inclination of the vehicle, as the at least one condition parameter, by an inclination sensor, and
   above a predetermined inclination of the mobile vehicle, increasing the rotational speed of the drive engine.

2. The method according to claim 1, further comprising controlling the rotational speed as a function of the inclination and an engaged gear in such a manner that the mobile vehicle remains at rest on an incline and is prevented from rolling backward.

3. The method according to claim 1, further comprising increasing the rotational speed of the drive engine as a function of a vehicle weight.

4. A method of starting or holding a mobile vehicle, having a drive engine which drives a vehicle wheel by way of a hydrodynamic torque converter, the method comprising: either:
   increasing a rotational speed of the drive engine, or
   downshifting a shiftable step-down transmission from an engaged gear ratio to a higher gear ratio,
   for starting or holding the vehicle as a function of at least one condition parameter of the vehicle; and
   determining, as the at least one condition parameter, an inclination of the vehicle by an inclination sensor, and,
   above a predefined inclination of the mobile vehicle, downshifting the shiftable step-down transmission from an engaged gear ratio to a higher gear ratio.

5. A method of starting or holding a mobile vehicle, having a drive engine which drives a vehicle wheel by way of a hydrodynamic torque converter, the method comprising: either:
   increasing a rotational speed of the drive engine, or
   downshifting a shiftable step-down transmission from an engaged gear ratio to a higher gear ratio,
   for starting or holding the vehicle as a function of at least one condition parameter of the vehicle; and
   determining, with a sensor, a rotation direction of a vehicle wheel of the mobile vehicle as the at least one condition parameter, and
   when a gear is engaged for a forward driving direction and the vehicle wheel rotates in a backward driving direction, increasing the rotational speed of the drive engine.

6. The method according to claim 5, further comprising determining, with the sensor, the rotation direction of the vehicle wheel of the mobile vehicle as the at least one condition parameter, and when a gear is engaged for the forward driving direction and the vehicle wheel rotates in the backward driving direction, downshifting the shiftable step-down transmission from the engaged gear ratio to the higher gear ratio.

7. The method according to claim 5, further comprising increasing the rotational speed of the drive engine as a function of a position of an accelerator pedal of the vehicle.

* * * * *